US010445500B2

(12) United States Patent
Schon et al.

(10) Patent No.: US 10,445,500 B2
(45) Date of Patent: Oct. 15, 2019

(54) RESET ATTACK DETECTION

(71) Applicant: ARM Limited, Cambridge (GB)

(72) Inventors: Guillaume Schon, Antibes (FR); Frederic Jean Denis Arsanto, Le Rouret (FR); Jocelyn François Orion Jaubert, Antibes (FR); Carlo Dario Fanara, Antibes (FR)

(73) Assignee: ARM Limited, Cambridge (GB)

( * ) Notice: Subject to any disclaimer, the term of this patent is extended or adjusted under 35 U.S.C. 154(b) by 289 days.

(21) Appl. No.: 15/635,614

(22) Filed: Jun. 28, 2017

(65) Prior Publication Data

US 2019/0005240 A1    Jan. 3, 2019

(51) Int. Cl.
*G06F 21/56* (2013.01)
*G06F 3/06* (2006.01)
*G06F 21/62* (2013.01)
*G06F 21/78* (2013.01)
*G06F 21/57* (2013.01)

(52) U.S. Cl.
CPC .......... *G06F 21/566* (2013.01); *G06F 3/0622* (2013.01); *G06F 3/0637* (2013.01); *G06F 3/0679* (2013.01); *G06F 21/577* (2013.01); *G06F 21/6218* (2013.01); *G06F 21/78* (2013.01); *G06F 2221/034* (2013.01)

(58) Field of Classification Search
CPC .... G06F 21/566; G06F 3/0622; G06F 3/0637; G06F 3/0679; G06F 21/577; G06F 21/6218; G06F 21/78; G06F 2221/034
See application file for complete search history.

(56) References Cited

U.S. PATENT DOCUMENTS

| | | | |
|---|---|---|---|
| 2004/0143710 A1* | 7/2004 | Walmsley | B41J 2/04505 711/144 |
| 2004/0153801 A1* | 8/2004 | Kayukawa | G01R 31/31719 714/30 |
| 2008/0137800 A1* | 6/2008 | Ohba | G06F 11/3466 377/19 |
| 2009/0288147 A1* | 11/2009 | Yeung | G06F 21/84 726/4 |
| 2013/0145130 A1* | 6/2013 | Brelot | G06F 9/384 712/217 |
| 2015/0356296 A1* | 12/2015 | Teglia | G06F 21/554 726/23 |
| 2016/0028394 A1* | 1/2016 | Tasher | H03K 19/003 326/8 |
| 2018/0091149 A1* | 3/2018 | Kuenemund | H03K 19/007 |

* cited by examiner

*Primary Examiner* — Amir Mehrmanesh
(74) *Attorney, Agent, or Firm* — Nixon & Vanderhye P.C.

(57) ABSTRACT

An apparatus has a number of data holding elements for holding data values which are reset to a reset value in response to a transition of a signal at a reset signal input of the data holding element from a first value to a second value. A reset tree is provided to distribute a reset signal received at root node of the reset tree to the reset signal inputs of the data holding elements. At least one reset attack detection element is provided, with its reset signal input coupled to a given node of the reset tree, to assert an error signal when its reset signal input transitions from the first value to a second value. Reset error clearing circuitry triggers clearing of the error signal, when the reset signal at the root node of the reset tree transitions from the second value to the first value.

9 Claims, 5 Drawing Sheets

RESET ATTACK DETECTION

BACKGROUND

Technical Field

The present technique relates to the field of data processing.

Technical Background

A data processing system including processing circuitry (e.g. a CPU or GPU) may have a reset mechanism to reset the processing circuitry to a known state, which can be used on power up or to recover from an error, for example. There may be many data holding elements within the system which need to be set to respective reset values during the reset operation. A reset tree may be provided with the reset signal inputs of the various data holding elements connected to respective branches of the reset tree. A reset signal received at a root node of the reset tree may be distributed via the reset tree to the reset signal inputs of the data holding elements. In some cases two or more independent reset trees could be provided in the same integrated circuit.

SUMMARY

At least some examples provide an apparatus comprising:
a plurality of data holding elements, each to hold a data value and to reset the data value to a reset value in response to a transition of a signal at a reset signal input of the data holding element from a first value to a second value;
a reset tree to distribute a reset signal received at a root node of the reset tree to reset signal inputs of the plurality of data holding elements;
at least one reset attack detection element comprising a reset signal input to receive the reset signal from a corresponding node of the reset tree, and to assert an error signal in response to a transition of a signal at the reset signal input of the reset attack detection element from the first value to the second value; and
reset error clearing circuitry to control each reset attack detection element to clear its error signal, in response to a transition of the reset signal received at the root node of the reset tree from the second value to the first value.

At least some examples provide an apparatus comprising:
a plurality of means for holding a data value and for resetting the data value to a reset value in response to a transition of a signal at a reset signal input of the means for holding from a first value to a second value;
means for distributing a reset signal received at a root node of the means for distributing to reset signal inputs of the plurality of means for holding;
at least one means for reset attack detection comprising a reset signal input to receive the reset signal from a corresponding node of the means for distributing, and for asserting an error signal in response to a transition of a signal at the reset signal input of the means for reset attack detection from the first value to the second value; and
means for controlling each means for reset attack detection to clear its error signal, in response to a transition of the reset signal received at the root node of the means for distributing from the second value to the first value.

At least some examples provide method for reset attack detection, comprising:
distributing a reset signal received at a root node of a reset tree to reset signal inputs of a plurality of data holding elements and at least one reset attack detection element coupled to the reset tree;
in response to a transition of a signal at the reset signal input of a given data holding element from a first value to a second value, resetting a data value held by the given data holding element to a reset value;
in response to a transition of a signal at the reset signal input of a given reset attack detection element from the first value to the second value, asserting an error signal; and
in response to a transition of the reset signal received at the root node of the reset tree from the second value to the first value, clearing the error signal asserted by each reset attack detection element.

Further aspects, features and advantages of the present technique will be apparent from the following description of examples, which is to be read in conjunction with the accompanying drawings.

DESCRIPTION OF EXAMPLES

Figure 1:
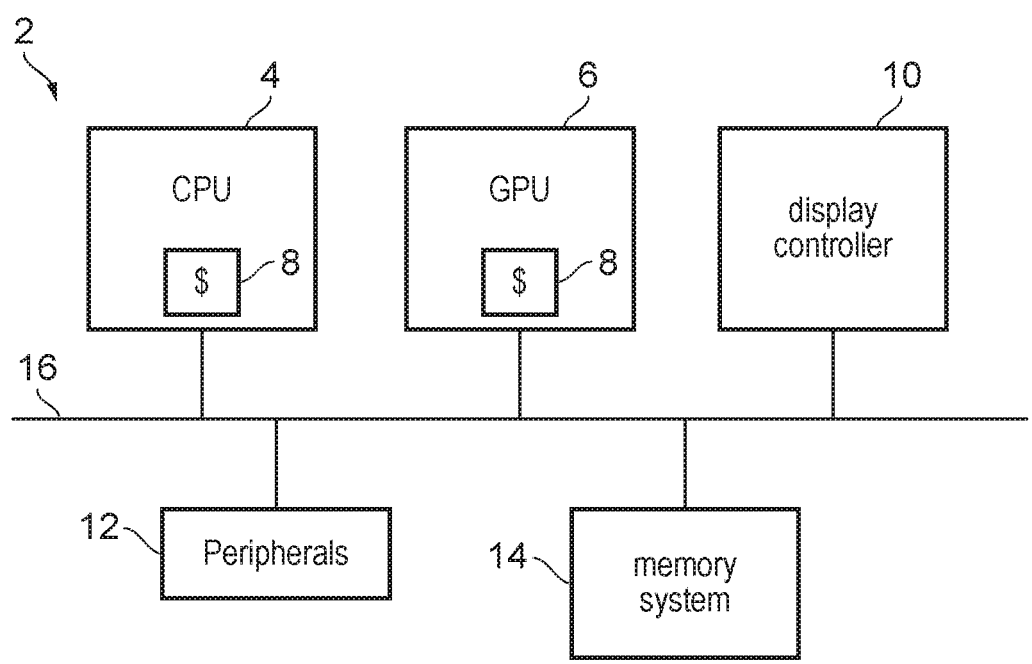
FIG. 1 schematically illustrates an example of a data processing system.

Some specific examples are described below. It will be appreciated that the invention is not limited to these precise examples.

A reset tree may be provided to distribute a reset signal to various data holding elements (e.g. flip-flops or latches), where a transition of the reset signal from a first value to a second value at a reset signal input of a given data holding element triggers the data holding element to reset its held data value to a corresponding default reset value. The inventors recognised that the reset tree may be vulnerable to a reset tree attack, in which an attacker may try to force the reset signal to switch from the first value to the second value at an intermediate node of the reset tree, even though the reset signal at the root node of the reset tree has not switched value. If the attacker is able to trigger a partial reset of a sub-portion of the reset tree without other portions being reset, this could lead to security breaches. For example, if the data holding elements which retain an indication of the current security state or privilege level of the system were reset and could be caused to switch to a more privileged state while other parts of the reset tree are left unchanged, this could lead to previously unprivileged code continuing to execute with a greater level of privilege which could lead to certain security constraints being circumvented. Hence, measures to guard against such reset tree attacks can help to improve security.

At least one reset attack detection element may be coupled at a given node of the reset tree so that its reset signal input receives the reset signal from the corresponding node of the reset tree. In response to a transition of a signal at the reset signal input of the reset attack detection element from the first value to the second value, an error signal is asserted by the reset attack detection element. Reset error clearing circuitry is provided to control each reset attack detection element to clear its error signal, in response to a transition of the reset signal received at the root node of the reset tree from the second value to the first value.

Hence, during a real reset event when the reset signal at the root node of the reset tree is switched from the first value to the second value, each reset attack detection element temporarily asserts its error signal, but when the reset is released and the reset signal at the root node of the reset tree is switched from the second value to the first value then the reset error clearing circuitry clears the asserted error signals from each reset attack detection element. Hence, when processing subsequently commences following the reset then no error will be indicated.

In contrast, if an attacker attempts to perform a partial reset of a sub-portion (e.g. one or more branches) of the reset tree, then the transition of the reset signal from the first value to the second value at an intermediate node of the tree triggers a reset attack detection element provided at or beyond that intermediate node to assert an error signal. As there is no corresponding transition of the reset signal at the root node of reset tree, then the reset error clearing circuitry does not subsequently clear this error signal. Hence, the error signal will remain asserted, and this can for example trigger a response action for addressing the reset tree attack to be performed.

Hence, by adding one or more additional data holding elements to the reset tree, which act as reset attack detection elements, this provides an anti-tampering feature which improves the security of a data processing system by making it less vulnerable to reset tree attacks.

Attack handling circuitry may be provided to detect a reset tree attack when one of the reset attack detection elements asserts its error signal in response to a transition of the reset signal from the first value to the second value at an intermediate node of the reset tree, in the absence of any transition of the reset signal received at the root node of the reset tree from the first value to the second value.

Although in some cases a reset tree could be provided with just a single reset attack detection element, in other embodiments there may be two or more reset attack detection elements with their reset signal inputs coupled to different nodes of the reset tree. In general the reset attack detection elements can be provided at any node of the reset tree at which the system would be vulnerable to reset tree attacks. Reset attack detection elements may not be needed at nodes where, if the downstream data holding elements were reset to their respective reset values, there would be unlikely to be any significant consequences in terms of security.

For example the reset attack detection elements could be provided at nodes from which the reset signal is provided to data holding elements which store certain sensitive data or information which, if reset while other parts of the reset tree are not reset, could lead to security breaches. For example, if the data holding elements include an operating state holding element which holds a state indicating value which is indicative of a current security state, privilege level or operating state of the processing circuitry, the at least one reset error detection element may include one or more reset element detection elements which are coupled to a node of the reset tree on a path for distributing the reset signal to the operating state holding element. This ensures that attempts to change the current operating state of the system by a reset tree attack on a part of the tree which includes the operating state holding element can be detected through the corresponding reset error detection elements provided on that branch of the tree. It will be appreciated that many other parts of the processing circuitry can also be protected using such reset attack detection elements, and the operating state holding element is just one example.

The processing circuitry may commence processing of a software workload following a transition of a reset signal received at the root node of the reset tree from the second value to the first value. The start of processing of the workload may be deferred until after the error clearing circuitry has cleared the error signals asserted by the recent attack detection elements so that the errors indicated following a real reset event can be cleared without affecting the correct processing of the software workload. On the other hand, when the error signal is asserted by one of the reset attack detection elements after processing of the workload by the processing circuitry has commenced, the attack handling circuitry may trigger an attack handling response, as this is a real error. Whether the reset is a real reset event or an attack can be distinguished by whether or not the reset signal transitions at the root node of the reset tree.

The attack handling response may include at least one of: triggering a reset by transitioning the reset signal received at the root node of the reset tree from the first value to the second value; reporting a reset tree attack to software executed by the processing circuitry; and disabling at least part of the apparatus. For example, part of the apparatus could be disabled by fusing (bricking) an element of the integrated circuit design, for example by burning through a fused connection or wire to prevent the apparatus functioning correctly.

When multiple reset attack detection elements are provided in the reset tree, the attack handling circuitry may detect which portions of the reset tree are subject to a reset tree attack in dependence on which of the reset attack detection elements asserts the error signal. This may allow more precise attack handling operations to be performed, targeted at the specific area of the integrated circuit where the attack was detected. However, this is not essential and other examples may simply combine the error signals of the reset attack detection elements in a logical OR operation, to output a combined error signal indicating whether a reset tree attack has been detected by any of the reset attack detection elements, without distinguishing which particular reset attack detection element detected the error.

FIG. 1 shows an example of a data processing system 2, which in this example comprises a CPU (central processing unit) 4 and a GPU (graphics processing unit) 6, which are examples of processing circuits. The CPU 4 and GPU 6 include a cache 8. A display controller 10 is provided for controlling display of graphics on a display unit. The system also includes one or more peripherals 12 and a memory system 14 which are coupled to the master devices 4, 6, 10 via a bus 16. It will be appreciated that this is just one example of possible architecture for the system, and the system may include other elements not shown in FIG. 1.

A data processing system such as the one shown in FIG. 1 may include a number of data holding elements (e.g. latches or flip flops) for holding various data values. The data holding elements may include not only storage elements such as registers for holding architectural state of the system, but also internal latches or flip-flops within the processing logic (e.g. an ALU) or control logic (e.g. an instruction decoder), which may need to be reset to a certain known state before any real processing operations are started in order to ensure that those processing operations are performed in a predictable manner.

Figure 2:
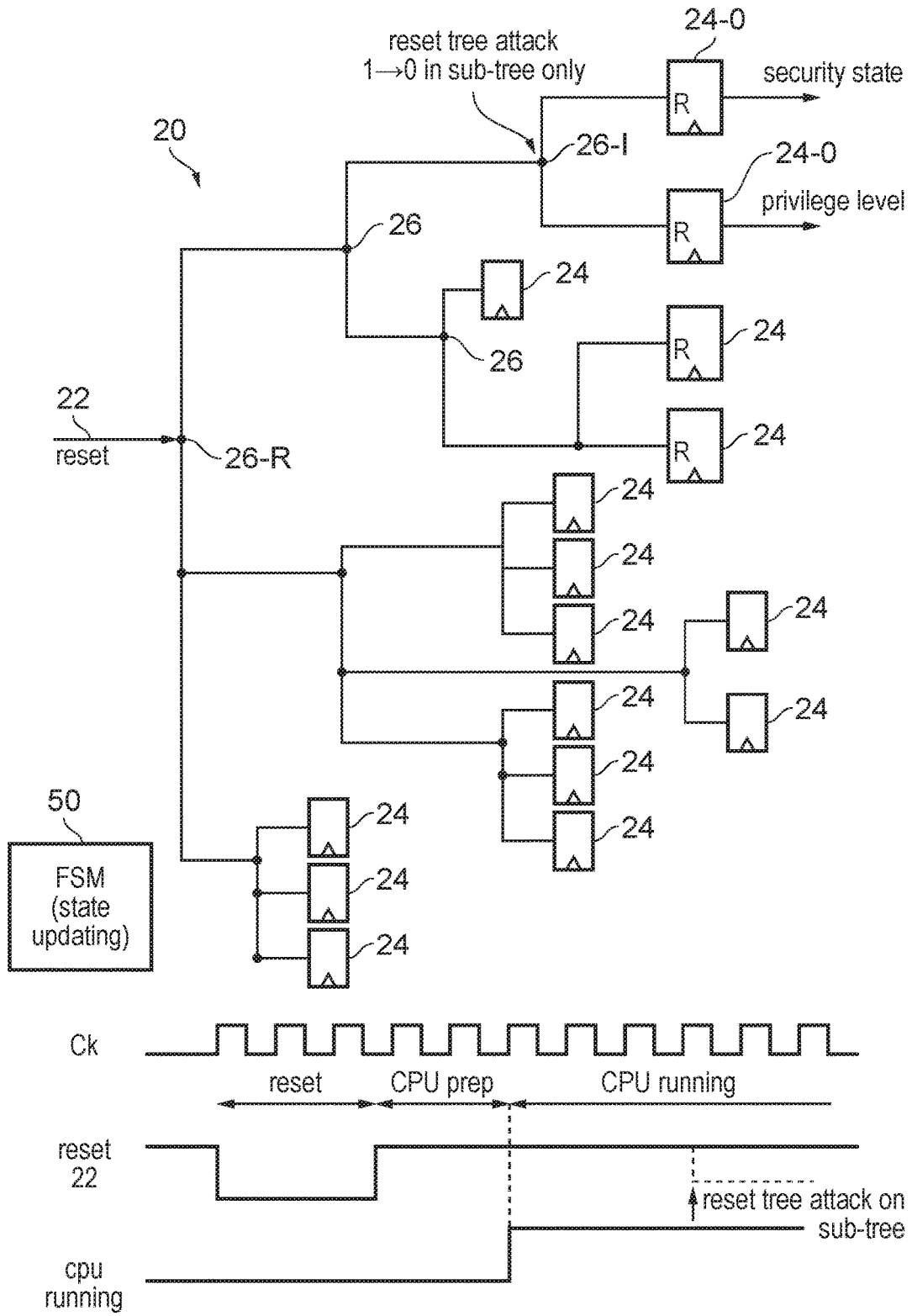
FIG. 2 shows an example of a reset tree for resetting a number of data holding elements to reset values.

As shown in FIG. 2, a reset tree 20 may be provided on an integrated circuit to distribute a reset signal 22 to various data holding elements 24 to be reset. While FIG. 2 shows a single reset tree 20 for ease of explanation, some integrated circuits may include two or more independent reset trees which are provided with separate reset signals from respective reset pins. The reset tree 20 includes a number of nodes 26 which are connected in a tree structure so that a reset signal 22 gradually fans out to different branches of the tree and eventually reaches the various data holding elements 24 at leaf nodes of the tree. Some data holding elements 24 may be located at lower levels of the tree than others. Each node 26 may correspond to a repeating buffer, which boosts the signal level of the reset signal as it is distributed over the integrated circuit, or could simply be a connecting wire or bump. Some of the data holding elements 24 may store an indication of a current operating state of a system, such as a security state or privilege level as shown in the top two data holding elements 24-O shown in FIG. 2.

As shown in the timing diagram at the bottom of FIG. 2, an asynchronous reset mechanism may be provided where the timing of the reset is not triggered relative to a particular phase of the clock signal. In this example the reset event is triggered on a falling edge of the reset signal 22 (dropping from high to low), but other examples could trigger reset by a rising edge of the reset signal. In this example on a falling edge of the reset signal, each data holding element 24 resets its data value to some default reset value. The default reset value could be low or high for different data holding elements (it is not essential for all of the data holding elements to have the same reset value). Subsequently the reset event is released by transitioning the reset signal 22 back to a high signal level, and at this point the CPU 4 or other processing circuit may perform a sequence of preparatory actions for preparing the processing circuitry to perform a software workload.

For example these preparatory actions could include loading a stack pointer into a stack pointer register, fetching an exception handling vector which identifies the address of an exception handling routine to be performed in the event of an exception or interrupt, and so on. Some of these preparatory actions may require the processing circuitry 4 to be operating in a privileged state or secure state and so typically some of the operating state holding elements 24-O shown in FIG. 2 may, on a reset, be reset to a value corresponding to a more privileged state. This may make the system vulnerable to reset tree attacks. During a real reset event, when the reset signal 22 at the root node 26-R of the reset tree 20 transitions low, the entire reset tree will experience the falling edge of the reset signal and so all the data holding elements connected to the tree will be reset, and so the processing circuitry may enter a predictable known state. However, if an attacker is able to tamper with the integrated circuit and force the reset signal at a given intermediate node 26-I of the reset tree to drop low, then this may cause some of the data holding elements 24 within a sub branch of the reset tree to reset to their default reset values, while other parts of the reset tree are not reset and may continue with the previous values. In some cases the other parts of the tree may continue function as normal and may continue to execute software instructions. If the part of the tree that has been attacked includes operating state holding elements 24-O, then this may allow the attacker to effectively switch the system into a secure or privileged state even if the software that was running at the time should be unprivileged or non-secure. This can lead to the constraints imposed by the software running in an unprivileged or less secure state being circumvented. In summary, by attacking the reset tree, the attacker may be able to reset only a sub-portion of the integrated circuit design, thus breaking the whole design's integrity state while letting the processing circuitry operate in a state in which it can still advance. At this point there is a problem since the whole system may not know that it is in a faulty and vulnerable state.

Figure 3:
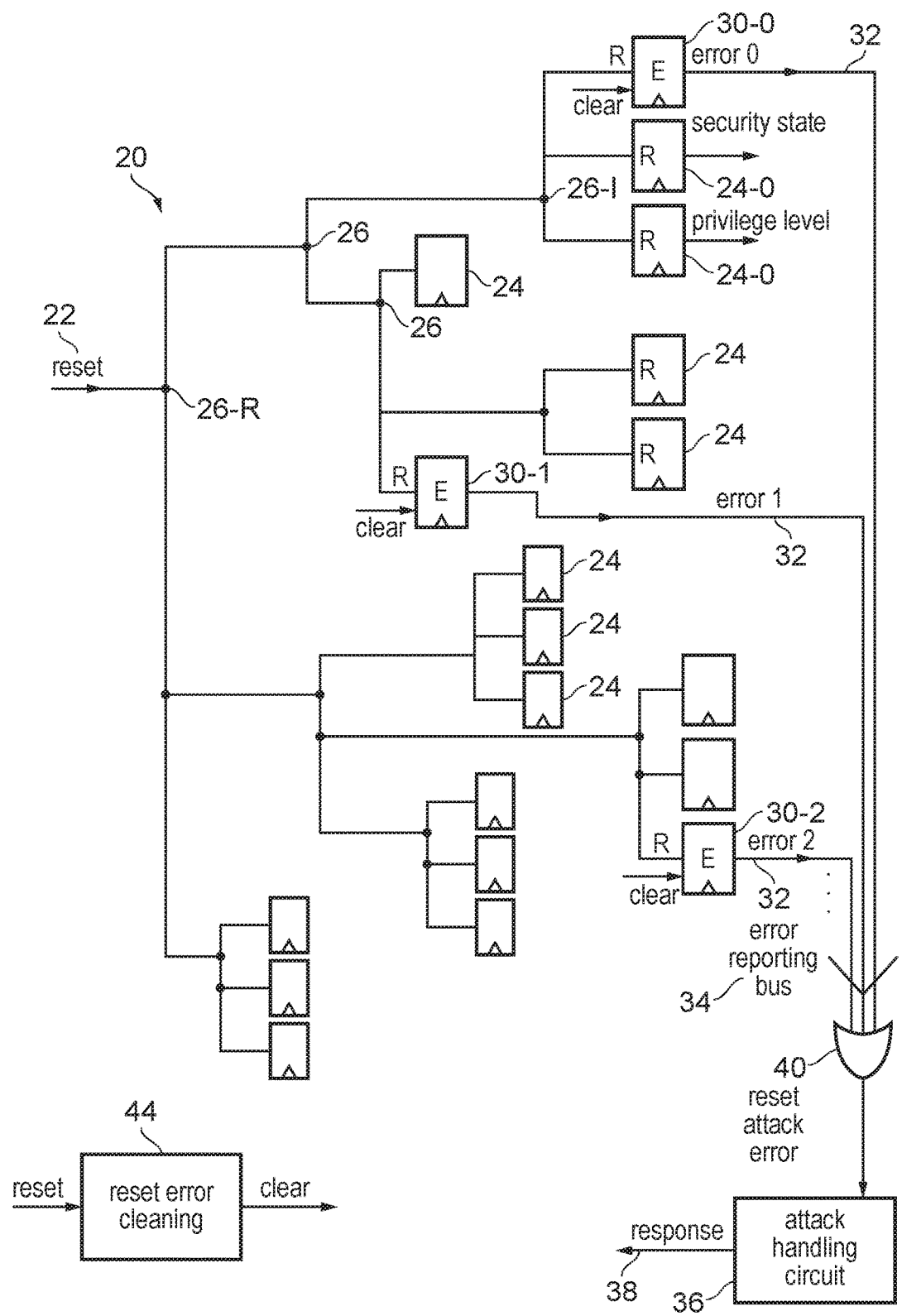
FIG. 3 shows an example of providing the reset tree with at least one reset attack detection element for protecting against reset tree attacks.

FIG. 3 shows a technique for protecting against such reset tree attacks. The reset tree 20 is similar to the one shown in FIG. 2, with some additional reset attack prevention elements 30 added to the reset tree, coupled at various intermediate nodes of the tree alongside some of the data holding elements 24. For example, reset attack prevention element 30-0 has its reset signal input coupled to node 26-I of the tree so that it forms a branch which is in parallel with the branches leading to the operating state holding elements 24-O. Similarly, further reset attack prevention elements 30-1 and 30-2 are shown at other nodes of the tree. Each reset attack prevention element 30 responds to the transition of the reset signal from the first value to the second value to trigger a reset in the same way as the data holding elements 24, except that rather than representing a real data value which is used by the processing circuitry 4, the outputs of the reset attack detection elements 30 asserted during a reset represent error signals 32. The error signals 32 are output over an error reporting bus 34 and passed to an attack handling circuit 36 which detects, based on the error signals 32, whether a reset tree attack has been performed, and triggers a reset attack handling response 38 when an attack is detected. For example the reset attack handling response could include notifying software that an attack has been performed and that the system may be vulnerable, triggering a real reset of the system to prevent ongoing software execution until all the data holding elements 24 have been reset back to their known state, and/or disabling at least part of the system, for example by fusing the design (e.g. burning through one or more wired connections) to prevent the system functioning correctly in the presence of the attack. The precise response taken when a reset tree attack is detected may depend on the particular implementation (e.g. on the consequences of the attack being successful).

In some cases the attack handling circuit 36 may be able to detect which particular portion of the reset tree has been subject to the attack in dependence on which of the error signal 32 is asserted. However, for many implementations the attack handling response 38 may not depend on the particular area of the tree subject to the attack, as it may instead simply perform an action for the system as a whole, and so in this case to simplify the attack handling circuit all of the error signals 32 on the error reporting bus 34 may simply be combined with a logical OR operation by an OR gate 40, and a combined reset attack error signal could be provided to the attack handling circuit 36 to indicate whether an error has been detected.

During a real reset event, when the reset signal 22 at the root node 26-R is switched from the first value to the second value, then the error detecting elements 30 will also assert their error signals. However, reset error clearing circuitry 44 is provided to clear the error signals of the reset attack detection elements 30 in response to a transition of the reset signal 22 at the root node 26-R from the second value to the first value. For example, the processing unit 4, 6 may already have some circuitry which implements a finite state machine for controlling a number of preparatory actions. The finite state machine may, in response to reset release, cycle through a number of states, with each state triggering a given action to be performed for preparing the system for subsequent execution of a software workload. The finite state machine could be extended to include a state which triggers clearing of the reset attack detection elements 30.

Figure 4:
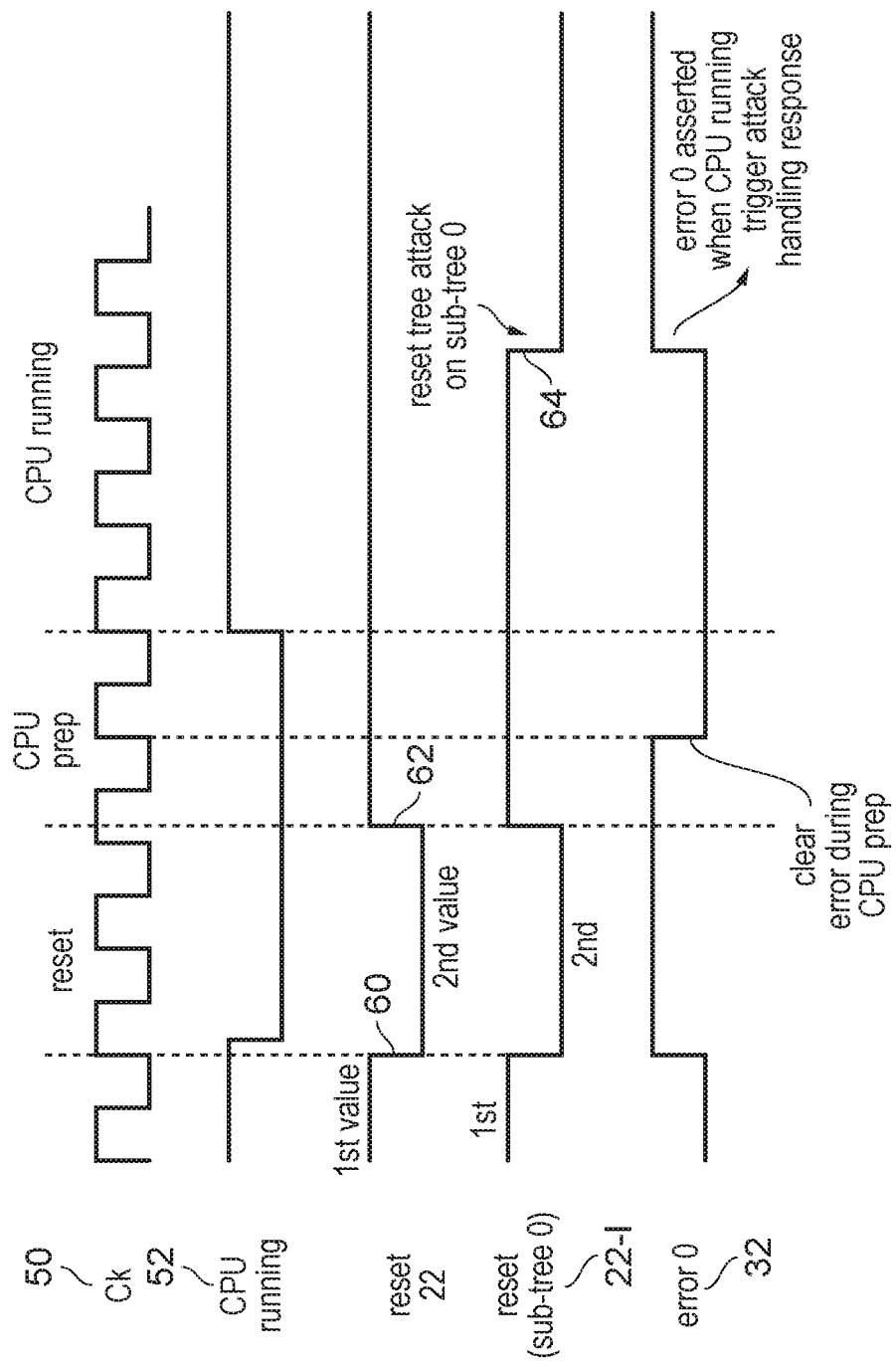
FIG. 4 is a timing diagram an example of using the reset attack detection element to protect against reset tree attacks.

FIG. 4 shows a timing diagram explaining the operation of FIG. 3. In general the reset signal has one of a first value and a second value, and the transition from the first value to the second value triggers the reset of the data holding elements 24 while the transition from the second value to the first value triggers release of the reset. In the example of FIG. 4 the first value is logical 1 and the second value is logical 0, but it will be appreciated that this could be the other way round in other implementations.

FIG. 4 shows a number of signals including a clock signal 50, a CPU running signal 52 which indicates whether the processor is operational for processing a software workload, the reset signal 22 input at the root node of the reset tree, and an intermediate reset signal 22-I which corresponds to the signal at an intermediate node 26-I of the reset tree other than the root node 26-R. The bottom signal in FIG. 4 shows the error signal 32 output by a given error detection element 30-0 which is coupled downstream from the intermediate node 26-I. In the example of FIG. 4, the logical 1 state of the error signal 32 represents the "asserted" state when an error is signaled, and logical 0 represents the "unasserted" error-free state. However, other examples could represent the asserted state by logical 0 and unasserted state by logical 1.

At time 60 in FIG. 4, the reset signal 22 at the root node 26-R of the tree is switched from the first value to the second value to trigger a reset event and this also causes the intermediate reset signal 22-I at the intermediate node 26-I to switch to the second value (after a signal propagation delay which is not shown in FIG. 4 for ease of explanation). The CPU running signal 52 also changes state following the reset, to indicate that the CPU is no longer executing a workload. In response to the transition of the reset signal from the first value to the second value, each of the data holding elements 24 in the reset tree reset their held data values to a corresponding default reset value. Some elements 24 may be configured to reset high and other elements may be configured to reset low, depending on the system design requirements. The falling transition of the reset signal also triggers the reset attack detection elements 30 to assert their error signal and so the error signal 32 rises to logical 1 (although in other examples, an asserted error signal could be represented by logical 0). As the CPU or other processing unit is not in the CPU running state, the attack handling circuit 36 does not trigger an attack handling response even though the error signal 32 is asserted.

At time 62, the reset is released, by switching the reset signal at the root node 26-R of the reset tree 20 back to the first value. Again, as the reset signal ripples through the tree, the intermediate reset signals 22-I will also switch back to the first value. This signals the start of a preparatory phase in which the processing circuitry 4, 6 performs some preparatory actions for preparing for processing a software workload. For example a finite state machine may be implemented, and a counter may be incremented on each clock cycle to cycle through a number of finite states, with each state controlling the processor to provide some preparatory action such as fetching a stack pointer, fetching a reset exception handling vector, and so on.

One of these preparatory actions may, as shown in FIG. 4, include clearing the error signals 32 asserted by the reset attack detection elements 30. This ensures that when the CPU subsequently starts running a software workload then no error will be detected. The reset error clearing circuitry 44 could be the circuitry which implements the finite state machine within the processing unit 4, 6 for performing the preparatory actions, or could be some separate circuit which detects, from the transition of the reset signal 22 at the root node 26-R of the reset tree from the second value to the first value, that this is a real reset event and so the errors are safe to be cleared.

Once the preparatory actions have been completed, then the CPU running signal 52 switches back high and the processor is now ready to execute a real software workload. In the absence of any reset tree attack then the error detection elements 30 will continue to output the error signals with value 0 and so no error is flagged.

However, if at time 64 a reset tree attack is performed on a given part of the reset tree then the reset signal 22-I in that part of the sub tree drops low even though the reset signal 22 at the root node 26-R has remained high. This triggers the data holding elements 24 in that part of the reset tree to reset to their default values but also triggers the reset attack detection elements 30 in that part of the tree to assert their error signal 32 as shown in FIG. 4. As the CPU running signal 52 is high then the attack handling circuit 36 detects that this is a real attack and not merely an assertion of an error during a proper reset event. Hence, the attack handling response is triggered to defend against the attack.

Hence, in one embodiment, the behaviour of the reset attack detection elements (guard flip-flops) 30 is as follows:
1. At asynchronous reset, the guard flops 30 are reset to 1'b1 (the error value).
2. At asynchronous reset release, the processing element's finite state machine (FSM) goes into a "reset state" and the first preparatory action taken by the FSM is to clear the guard flops to 1'b0 (the "safe" value).
3. The processing element's FSM continues with its logical reset steps, e.g. fetching the main stack pointer, fetching a reset exception handling vector, etc.
4. During normal run-time, the guard flops 30 remain at 0, and only change value in response to a reset.
5. The reset guard error bus 34 is stuck to the 1'b0 state (the "safe" value) and no error is reported to the system.

During a reset tree attack, the behaviour may be as follows:
1. When only a sub-part of the full reset tree is attacked, the local guard flops 30 protecting this part of the tree 20 are asynchronously reset to 1'b1 (the error value).
2. The reset guard error bus 34 has at least one bit rising to 1'b1, so an error are reported to the system.
3. The system can manage the error (e.g. by resetting the design, fusing the design, etc.).

The precise location of the reset attack detection elements 30 may vary from implementation to implementation and may be determined automatically by a placing and routing algorithm as part of an electronic design automation process, with the exact placement depending on the particular needs of the system and which elements are desired to be protected from reset tree attacks. It is not necessary for every branch of the reset tree to have a reset attack detection element.

The technique discussed above is relatively cheap to implement as the cost is merely a few additional flip-flops and wiring added to the reset tree. The driving of the flops does not decrease frequency. The setting of the guard flops 30 to a safe value following reset release is also relatively cheap to implement since often the processing element 4, 6, 10 may already have a finite state machine for handling various actions to be performed following reset, which can be expanded to provide clearing of the guard flops 30. If more guard flops 30 are added, the detection granularity for reset attacks can be more fine-grained, allowing more precise detection of the particular sub-branch of the reset tree at which the attack was performed.

Figure 5:
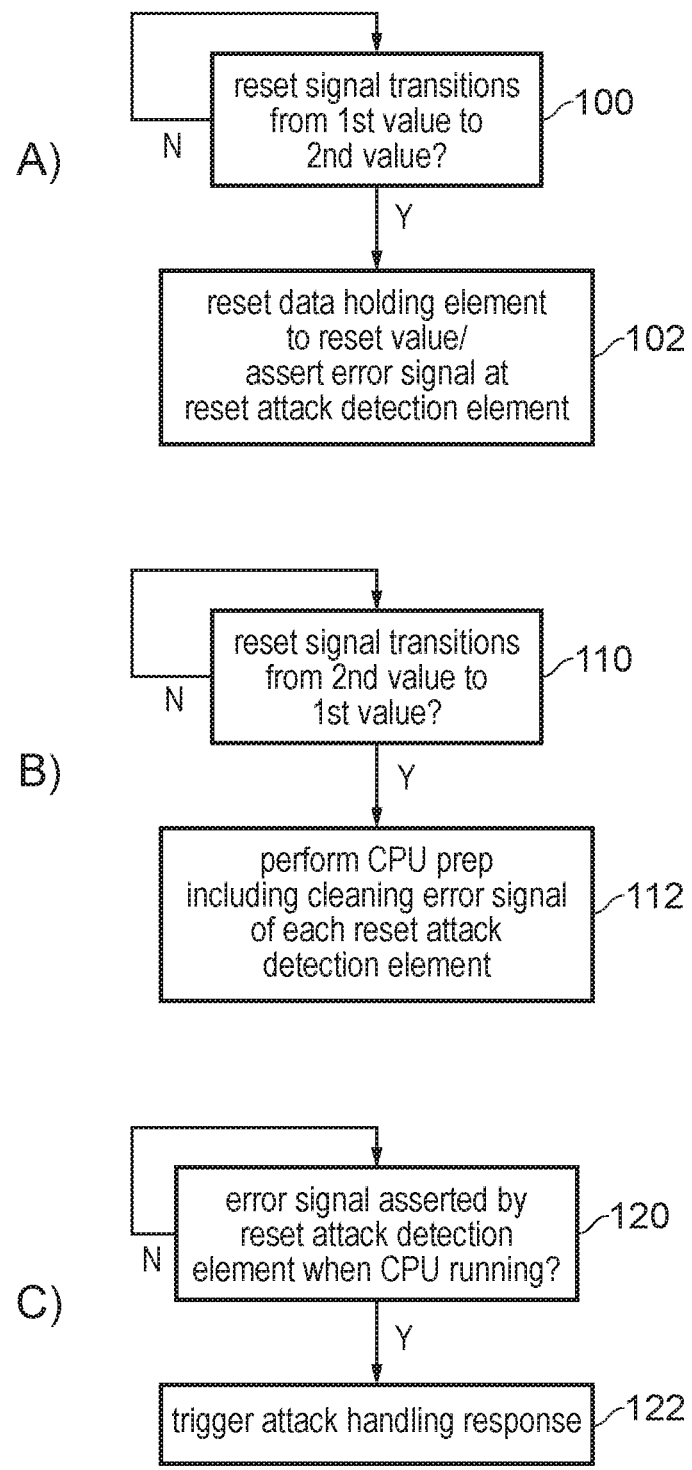
FIG. 5 is a flow diagram showing a method of defending against reset tree attacks.

FIG. 5 is a flow diagram showing a method of defending against reset tree attacks. FIG. 5 shows three portions A, B, C representing functionality which may each be performed in parallel with each other. In part A, at step 100, the data holding elements 24 and reset attack detection elements 30 each detect whether the reset signal 22 coupled to their respective signal inputs has transitioned from the first value to the second value. If so then at step 102 a data holding element resets its held data value to a reset value, while a reset attack detection element 30 asserts its error signal 32.

In part B, the reset error clearing circuitry 40 at step 110 detects whether the reset signal 22 at the root node 26-R transitions from the second value to the first value. If so then at step 112 the error signals are cleared for each of the reset attack detection elements 30.

In part C, at step 120 the attack handling circuit 36 detects whether an error signal 32 has been asserted by any of the reset attack detection elements 30 while the processor is in the CPU running state (the state in which software workloads are processed). If so then at step 122 an attack handling response is triggered.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
a plurality of data holding elements, each to hold a data value and to reset the data value to a reset value in response to a transition of a signal at a reset signal input of the data holding element from a first value to a second value;
a reset tree to distribute a reset signal received at a root node of the reset tree to reset signal inputs of the plurality of data holding elements;
at least one reset attack detection element comprising a reset signal input to receive the reset signal from a corresponding node of the reset tree, and to assert an error signal in response to a transition of a signal at the reset signal input of the reset attack detection element from the first value to the second value;
reset error clearing circuitry to control each reset attack detection element to clear its error signal, in response to a transition of the reset signal received at the root node of the reset tree from the second value to the first value; and
attack handling circuitry to detect a reset tree attack when the at least one reset attack detection element asserts the error signal in response to a transition of the reset signal from the first value to the second value at an intermediate node of the reset tree in the absence of a transition of the reset signal received at the root node of the reset tree from the first value to the second value.

2. The apparatus according to claim 1, comprising a plurality of said reset attack detection elements with their reset signal inputs coupled to different nodes of the reset tree.

3. The apparatus according to claim 1, comprising processing circuitry to commence processing of a workload following transition of the reset signal received at the root node of the reset tree from the second value to the first value.

4. The apparatus according to claim 3, comprising attack handling circuitry to trigger an attack handling response when the error signal is asserted by one of said at least one reset attack detection element after processing of the workload by the processing circuitry has commenced.

5. The apparatus according to claim 4, wherein the attack handling response comprises at least one of:
triggering a reset by transitioning the reset signal received at the root node of the reset tree from the first value to the second value;
reporting a reset tree attack to software executed by the processing circuitry; and
disabling at least part of the apparatus.

6. The apparatus according to claim 2, comprising attack handling circuitry to detect a portion of the reset tree subject to a reset tree attack in dependence on which of said plurality of reset attack detection elements asserts the error signal.

7. The apparatus according to claim 1, wherein said plurality of data holding elements include an operating state holding element to hold a state indicating value indicative of a current security state, privilege level or operating state of processing circuitry;
wherein said at least one reset attack detection element includes one or more reset attack detection elements coupled to a node of the reset tree on a path for distributing the reset signal to the operating state holding element.

8. An apparatus comprising:
a plurality of means for holding a data value and for resetting the data value to a reset value in response to a transition of a signal at a reset signal input of the means for holding from a first value to a second value;
means for distributing a reset signal received at a root node of the means for distributing to reset signal inputs of the plurality of means for holding;
at least one means for reset attack detection comprising a reset signal input to receive the reset signal from a corresponding node of the means for distributing, and for asserting an error signal in response to a transition of a signal at the reset signal input of the means for reset attack detection from the first value to the second value;
means for controlling each means for reset attack detection to clear its error signal, in response to a transition of the reset signal received at the root node of the means for distributing from the second value to the first value; and
attack handling circuitry to detect a reset tree attack when the at least means for reset attack detection asserts the error signal in response to a transition of the reset signal from the first value to the second value at an intermediate node of the means for distributing in the absence of a transition of the reset signal received at the root node of the means for distributing from the first value to the second value.

9. A method for reset attack detection, comprising:
  distributing a reset signal received at a root node of a reset tree to reset signal inputs of a plurality of data holding elements and at least one reset attack detection element coupled to the reset tree;
  in response to a transition of a signal at the reset signal input of a given data holding element from a first value to a second value, resetting a data value held by the given data holding element to a reset value;
  in response to a transition of a signal at the reset signal input of a given reset attack detection element from the first value to the second value, asserting an error signal;
  in response to a transition of the reset signal received at the root node of the reset tree from the second value to the first value, clearing the error signal asserted by each reset attack detection element; and
  detecting a reset tree attack when said at least one reset attack detection element asserts the error signal in response to a transition of the reset signal from the first value to the second value at an intermediate node of the reset tree in the absence of a transition of the reset signal received at the root node of the reset tree from the first value to the second value.

* * * * *